(12) United States Patent
Rosenberg

(10) Patent No.: US 7,155,865 B2
(45) Date of Patent: Jan. 2, 2007

(54) PREFABRICATED HOUSING STRUCTURE

(75) Inventor: Abraham Rosenberg, Brooklyn, NY (US)

(73) Assignee: Certified Lumber, LLC, Brooklyn, NY (US)

( * ) Notice: Subject to any disclaimer, the term of this patent is extended or adjusted under 35 U.S.C. 154(b) by 75 days.

(21) Appl. No.: 10/692,521

(22) Filed: Oct. 24, 2003

(65) Prior Publication Data
US 2005/0050808 A1   Mar. 10, 2005

Related U.S. Application Data

(60) Provisional application No. 60/501,694, filed on Sep. 9, 2003, provisional application No. 60/500,089, filed on Sep. 4, 2003.

(51) Int. Cl.
E04H 1/00 (2006.01)

(52) U.S. Cl. ............... 52/79.9; 52/79.5; 52/590.2; 52/591.1; 52/591.4; 52/592.3; 220/4.21; 220/4.26; 220/4.31; 220/4.32; 403/380; 403/381; 446/108; 446/110; 446/115; 446/116; 446/120; 446/128

(58) Field of Classification Search ........... 52/590.2, 52/590.3, 592.2, 592.4, 436, 79.1, 79.2, 79.4, 52/79.5, 79.9, 591.1, 591.4, 592.3, 592.1; 220/6, 4.21, 4.26, 4.27, 4.28, 4.31, 4.32; 403/381, 382, 375, 380; 446/109, 104, 120, 446/124, 102, 108, 110, 115, 116, 127, 128
See application file for complete search history.

(56) References Cited

U.S. PATENT DOCUMENTS 2,057,942 A * 10/1936 Fay .................... 446/112
2,691,242 A * 10/1954 Young .................. 446/115
3,442,311 A * 5/1969 Rhyne .................. 144/354
3,692,201 A * 9/1972 Garduna ............... 217/12 R
3,844,083 A * 10/1974 Farley, Jr. ............... 52/645
4,035,965 A * 7/1977 Ronai ..................... 52/66
4,173,287 A * 11/1979 Kumakawa ............. 217/65
4,874,341 A * 10/1989 Ziegler ................. 446/109
5,118,547 A * 6/1992 Chen ..................... 428/44
5,357,728 A * 10/1994 Duncanson ........... 52/592.4
5,400,178 A * 3/1995 Yamada et al. ........ 359/449
5,895,045 A * 4/1999 Vilar .................... 273/160
6,488,153 B1 * 12/2002 Morris .................. 206/523
6,665,993 B1 * 12/2003 Sorensen et al. ...... 52/591.2

* cited by examiner

Primary Examiner—Jeanette Chapman
Assistant Examiner—Yvonne M. Horton
(74) Attorney, Agent, or Firm—Bernard Malina; Malina & Associates, P.C.

(57) ABSTRACT

A housing structure includes a first plurality of wall panels which form a lower course and a second plurality of wall panels which form an upper course. Each of the wall portions is generally rectangular and includes integrally formed interlocking portions which facilitate attachment of adjacent lateral edges of the wall portions of the first plurality to each other. Integrally formed interlocking portions facilitate attachment of the panels in the lower course to the panels in the upper course. In addition, rectangular roof panels are provided to enclose the housing structure. The interlocking portions enable the panels to slide into an interlocked engagement configuration thereby forming a rigid structure without the need for tools.

17 Claims, 19 Drawing Sheets

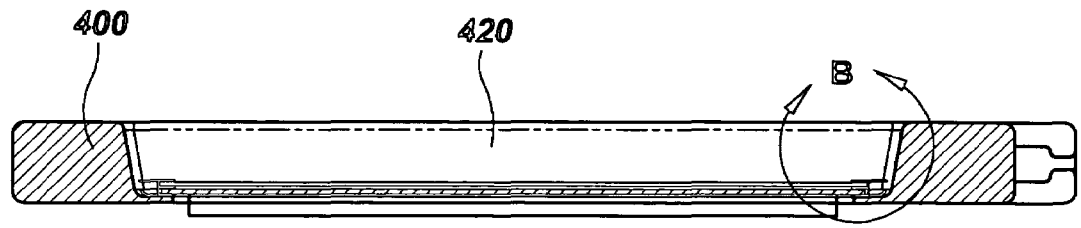
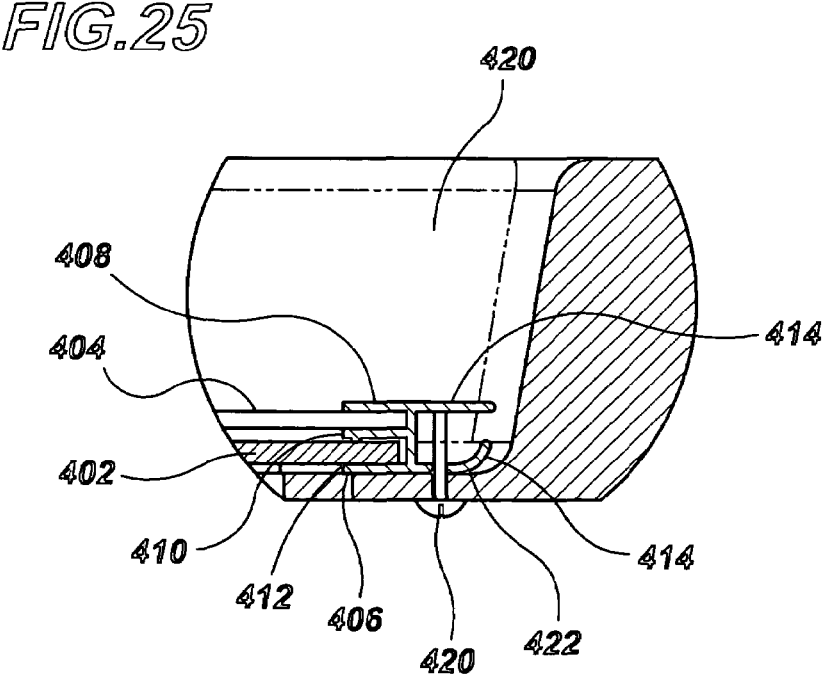

PREFABRICATED HOUSING STRUCTURE

RELATED APPLICATIONS

This application claims priority from Provisional Application No. 60/501,694, filed Sep. 9, 2003, and Provisional Application No. 60/500,089, filed Sep. 4, 2003.

FIELD OF THE INVENTION

The present invention relates generally to the field of housing structures and more particularly to a prefabricated housing structure having a plurality of interlocking panels.

BACKGROUND OF THE INVENTION

The prior art related to housing structures includes numerous examples of prefabricated structures. These structures are typically composed of a plurality of prefabricated flat panels which are assembled at the location of use to form a structure. The assembly of conventional prefabricated operation generally involves the use of various fasteners which require various hand or power tools. The fasteners are used to join the edges of the panels to form rigid structure. In an effort to overcome the disadvantages associated with the need to assemble the relatively large number of fasteners in a conventional prefabricated structure, designers often resort to the use of relatively large panels thereby reducing the total number of joints for a given size structure. However, the use of relatively large panels results in additional shipping cost and relatively heavy panels which results in the need for two or more workers to accomplish the erection process. Despite the developments of the prior art, there remains a need for a prefabricated housing structure which can be easily erected and disassembled.

OBJECTS AND SUMMARY OF THE INVENTION

It is an object of the present invention to provide a prefabricated housing structure which can be easily assembled and disassembled.

Another object of the present invention is to provide a prefabricated housing structure which can be easily stored when not in use.

Another object of the present invention is to provide a prefabricated housing structure which includes a plurality of relatively small rigid panels.

Another object of the present invention is to provide a prefabricated housing structure which includes a plurality of panels which interlock to form a rigid structure.

Another object of the present invention is to provide a prefabricated housing structure which includes a plurality of relatively light weight panels which can be assembled without the use of tools.

Yet another object of the present structure is to provide a prefabricated housing structure which is composed of a number of components which can be easily manufactured, in volume, resulting in a relatively low overall cost.

Additional objects and advantages of the present invention will be provided hereinafter.

In accordance with the present invention, there is provided a prefabricated housing structure which includes a first plurality of wall panels which form a lower course and a second plurality of wall panels which form an upper course. Each of the wall portions is generally rectangular and includes integrally formed interlocking portions which facilitate the attachment of adjacent lateral edges of the wall portions of the first plurality to each other. Integrally formed interlocking portions on the panels facilitate attachment of the panels in the lower course to the panels in the upper course. In addition, rectangular roof panels are provided to enclose the housing structure.

The interlocking portions enable the various panels to slide into an interlocked engagement configuration thereby forming a rigid structure without the need for tools.

BRIEF DESCRIPTION OF THE DRAWINGS

Other important objects and advantages of the invention will be apparent from the following description of the invention taken in connection with the accompanying drawings in which:

FIG. 24 is a cross-sectional view taken along the line 24—24 of FIG. 23; and

FIG. 25 is a fragmentary portion of FIG. 24 drawn to an enlarged scale.

DETAILED DESCRIPTION OF THE INVENTION

Figure 1:
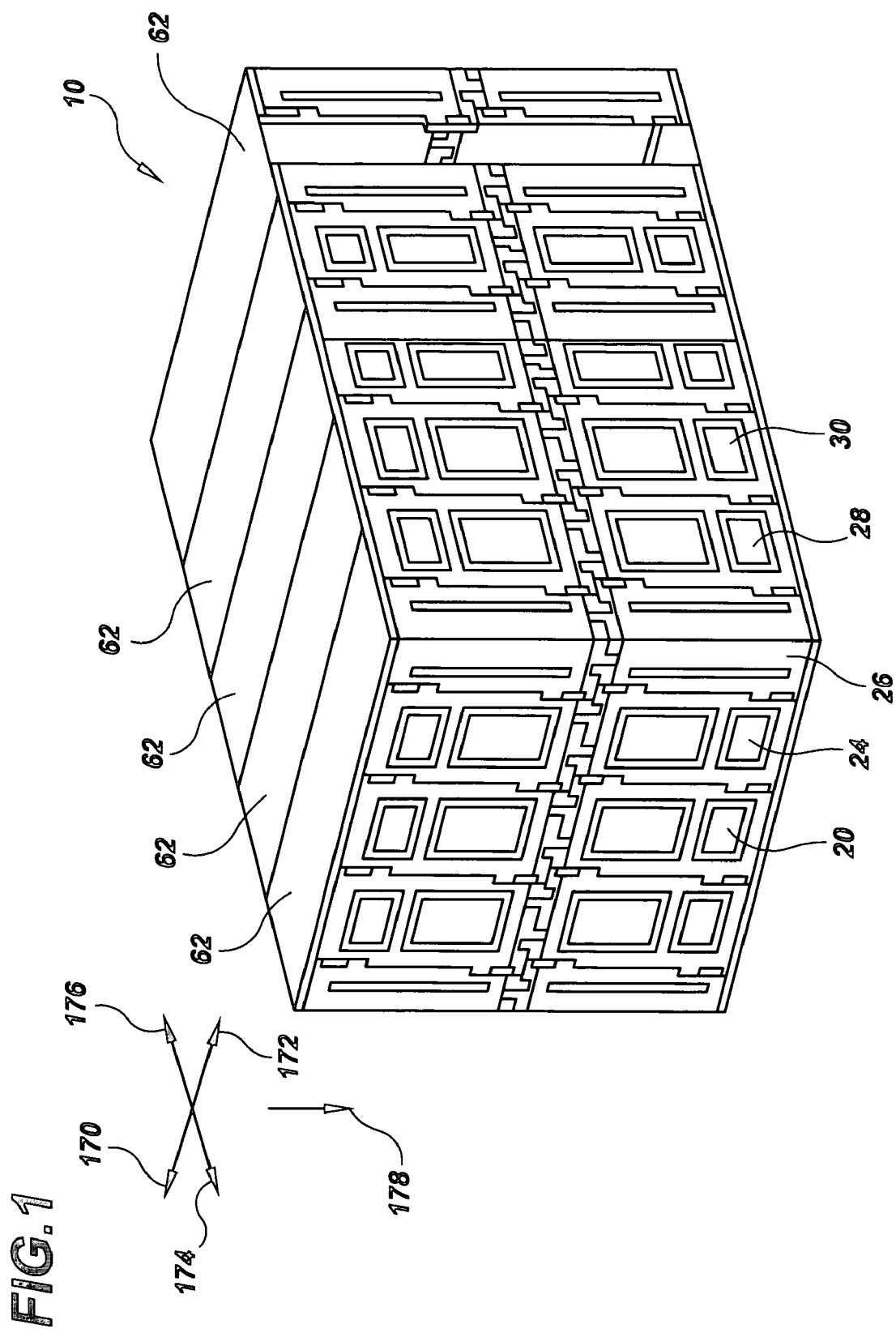
FIG. 1 is an overall perspective view of a prefabricated housing structure made according to the present invention.

With reference to the drawings, there is shown in FIG. 1 a prefabricated housing structure 10 made in accordance with the present invention.

Figure 2:
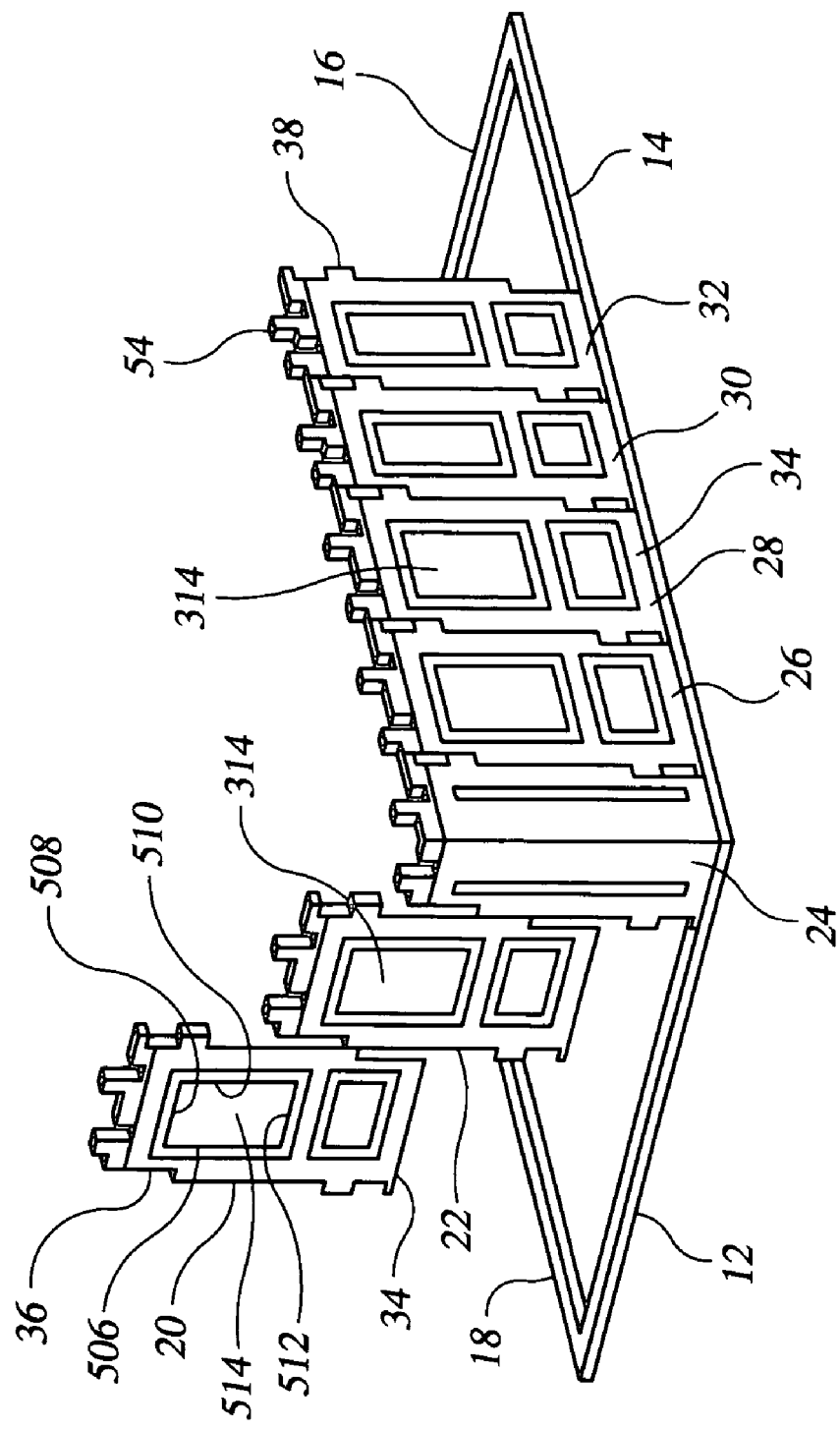
FIG. 2 is a perspective view of the first step and the second step in the erection of the prefabricated housing structure of FIG. 1.

FIG. 2 shows the first two steps in the erection of the prefabricated housing structure 10 showing the placement of the base channels 12, 14, 16, 18. The first step comprises the placement of the base channels 12, 14, 16, 18 to form a rectangle which defines the perimeter of the structure.

The second step includes the placement of the lower panels 20, 22, 26, 28, 30, 32. The lower panels 20, 22, 26, 28, 30, 32 are shown with their bottom portions 34 inserted into the base channels 12, 14, 16, 18. FIG. 2 also shows the corner panel 24 and the method of interlocking the individual lower panels to form the first course 54 of walls 36, 38.

Figure 3:
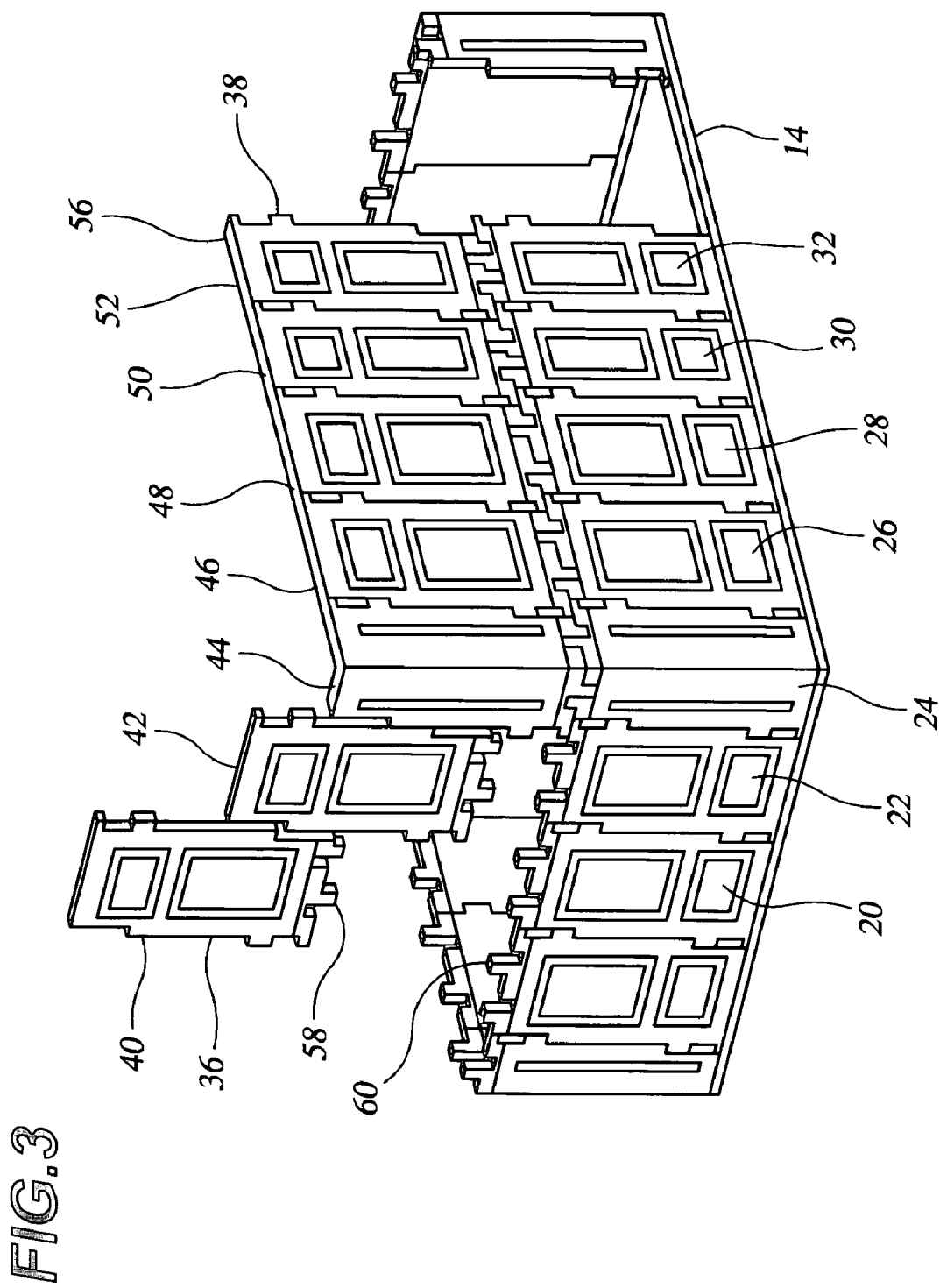
FIG. 3 is a perspective view of the third step in the erection of the prefabricated housing structure of FIG. 1.

FIG. 3 shows the third step which includes the placement of the upper panels 40, 42, 44, 46, 48, 50, 52 to form the second course 56 of the walls 36, 38. As shown in FIG. 3, the lower edges 58 of the upper panels 40, 42, 44, 46, 48, 50, 52 engage the upper edges 60 of the lower panels 20, 22, 26, 28, 30, 32 of the first course 54.

Figure 4:
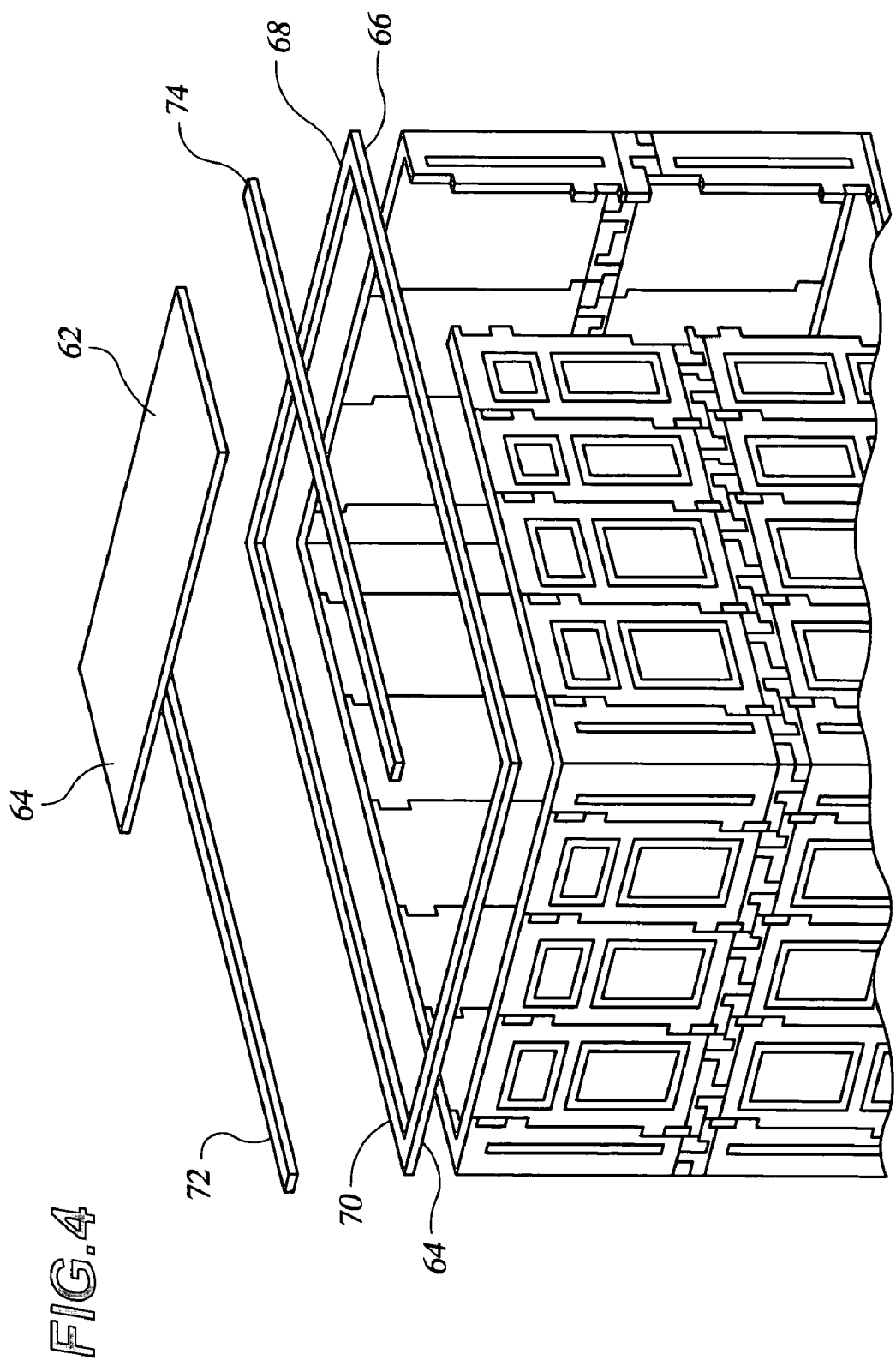
FIG. 4 is a fragmentary exploded perspective view of the fourth step in the erection of the prefabricated housing structure of FIG. 4.

FIG. 4 shows the completion of the second course 54 of upper panels and the erection of the roof 62. The roof 62 includes top channels 64, 66, 68, 70 which are mounted on the upper edges of the upper panels and a plurality of roof panels which are illustrated typically by the roof panel 64. The roof also includes roof channels 72, 74 which engage the roof panels 62.

Figure 5:
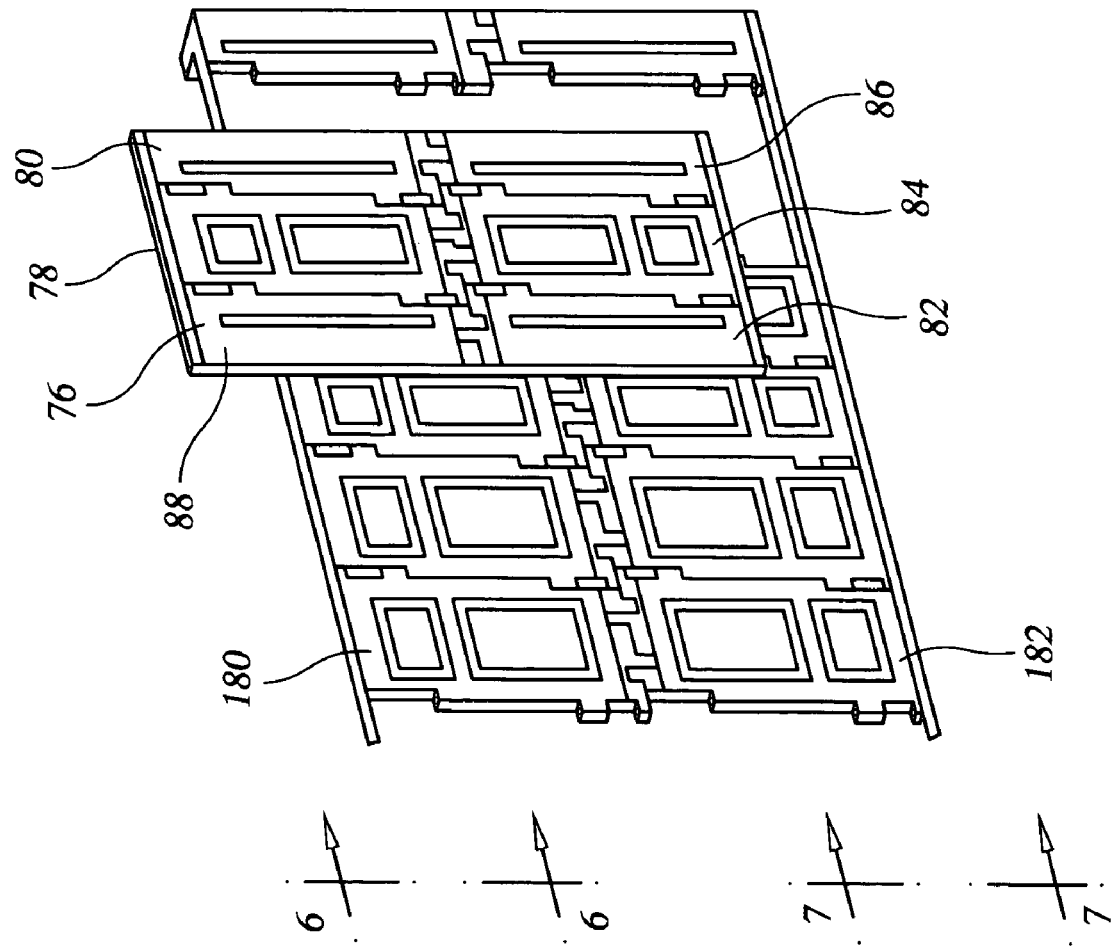
FIG. 5 is a fragmentary perspective view of the fifth step in the erection of the prefabricated housing structure of FIG. 1 showing the installation of the door.
Figure 6:
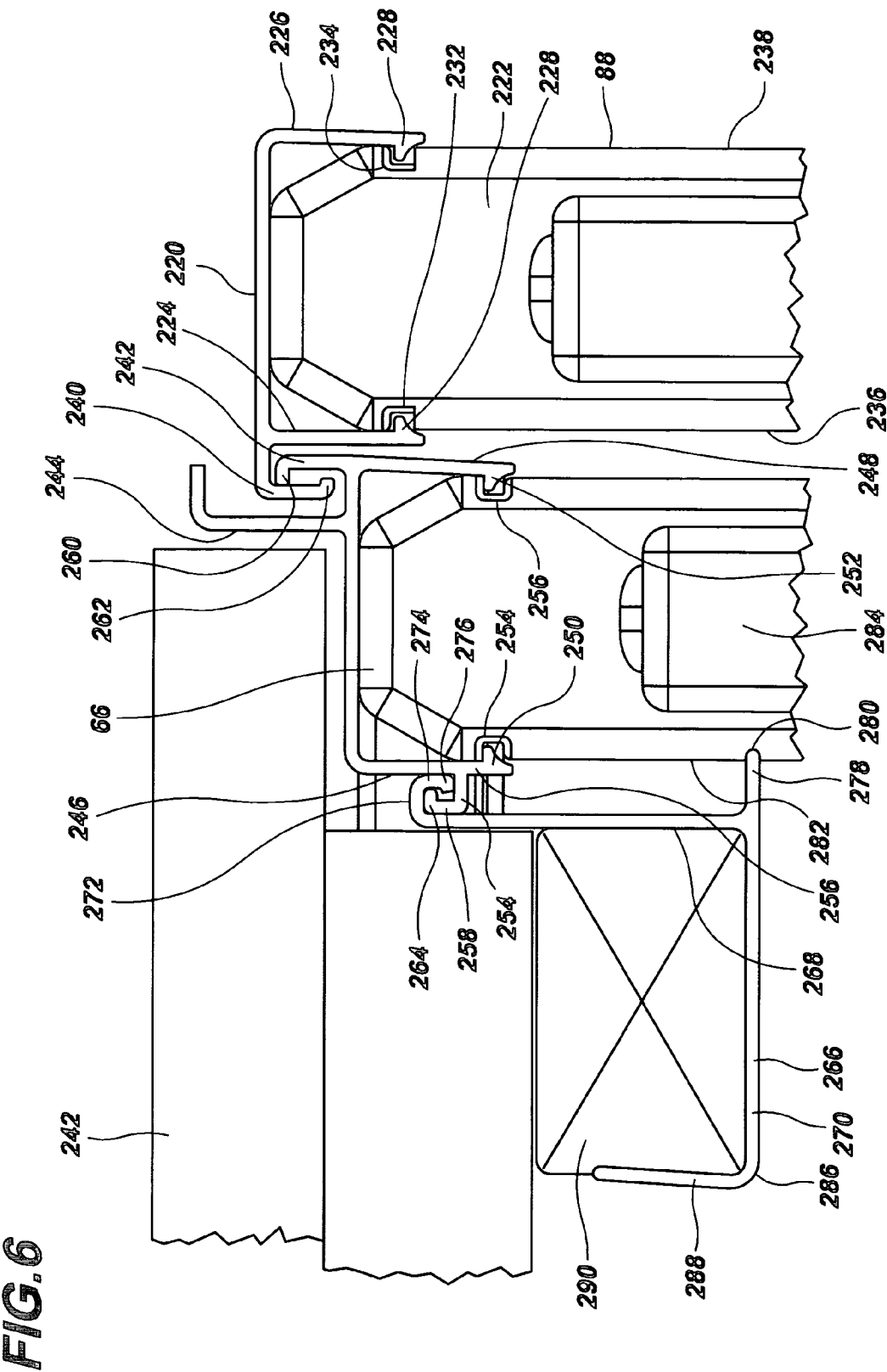
FIG. 6 is an elevation view of the corner panel of the prefabricated housing structure of FIG. 1.
Figure 7:
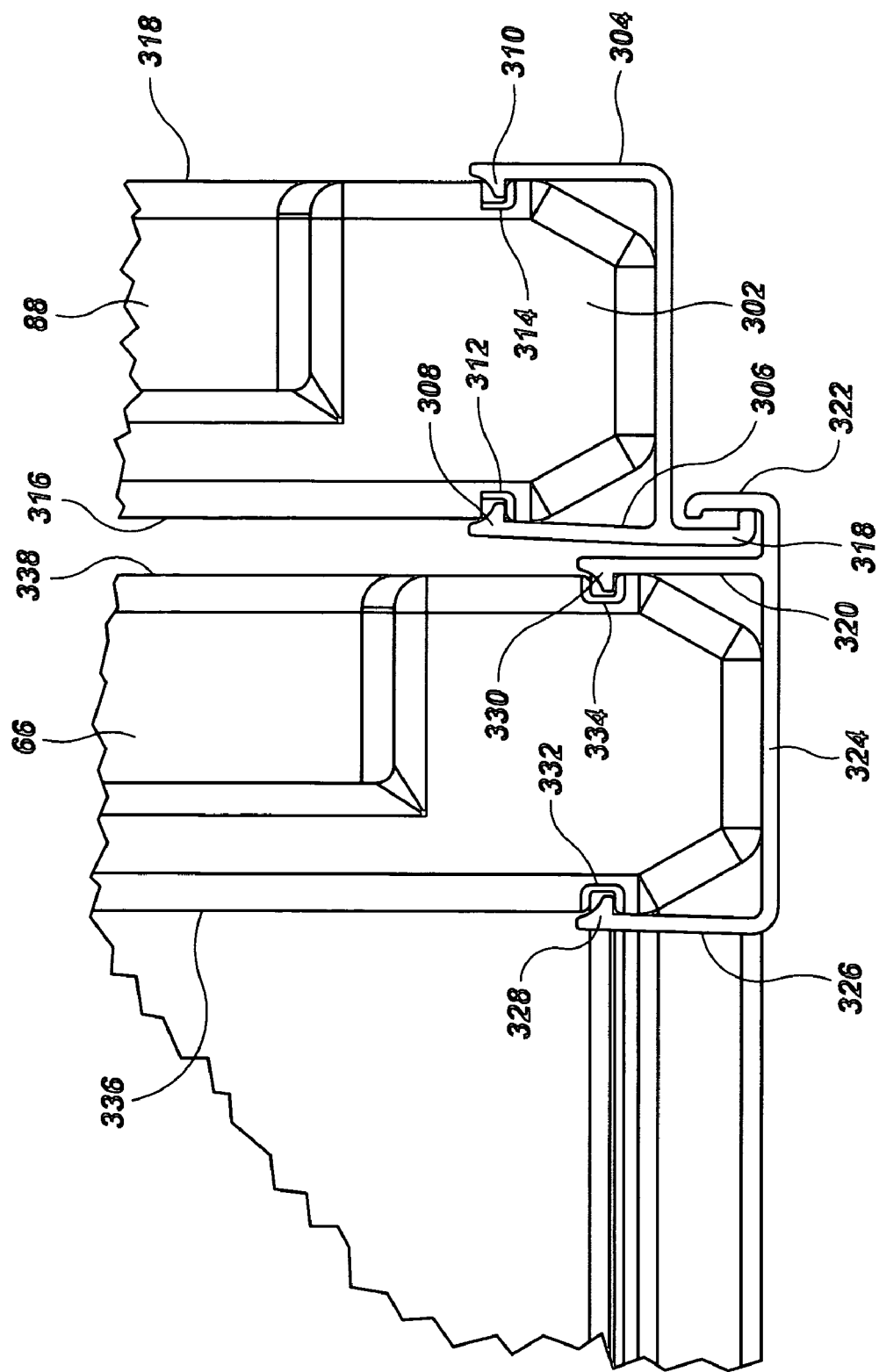
FIG. 7 is a fragmentary cross-sectional view taken along the line 6—6 of FIG. 5.

FIGS. 5, 6 and 7 show the installation of the sliding door. The sliding door 88 includes six panels 76, 78, 80, 82, 84, 86. The operation of the sliding door 88 will be described presently.

A key feature of the present invention is related to the configuration of the interface between the various panels. This interface enables the various panels to interlock in a manner which enables the assembled panels to withstand the application of forces in various directions and thus form a rigid structure without the need for fasteners of any kind.

Figure 8:
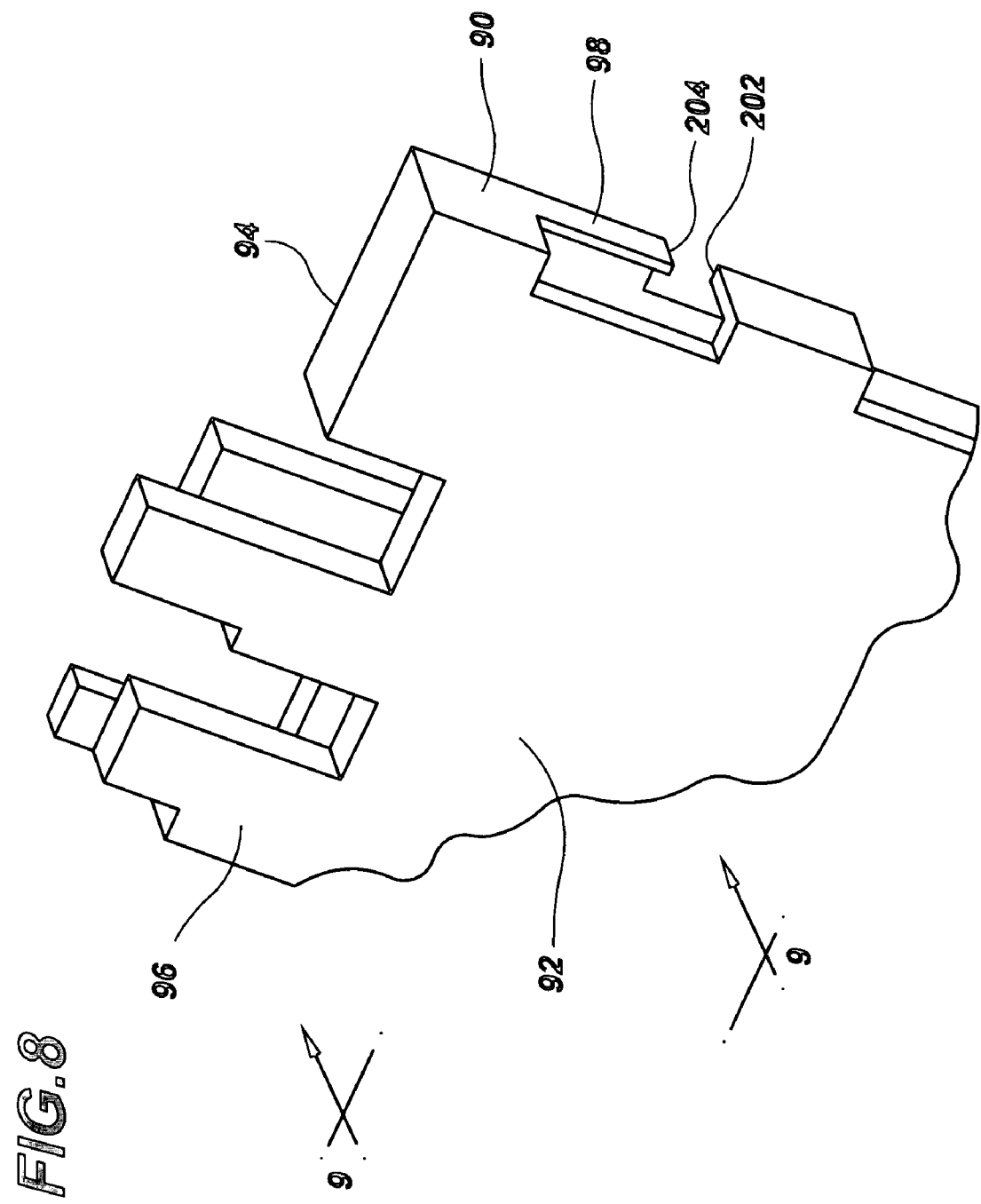
FIG. 8 is a fragmentary cross-sectional view taken along the line 7—7 of FIG. 5.
Figure 9:
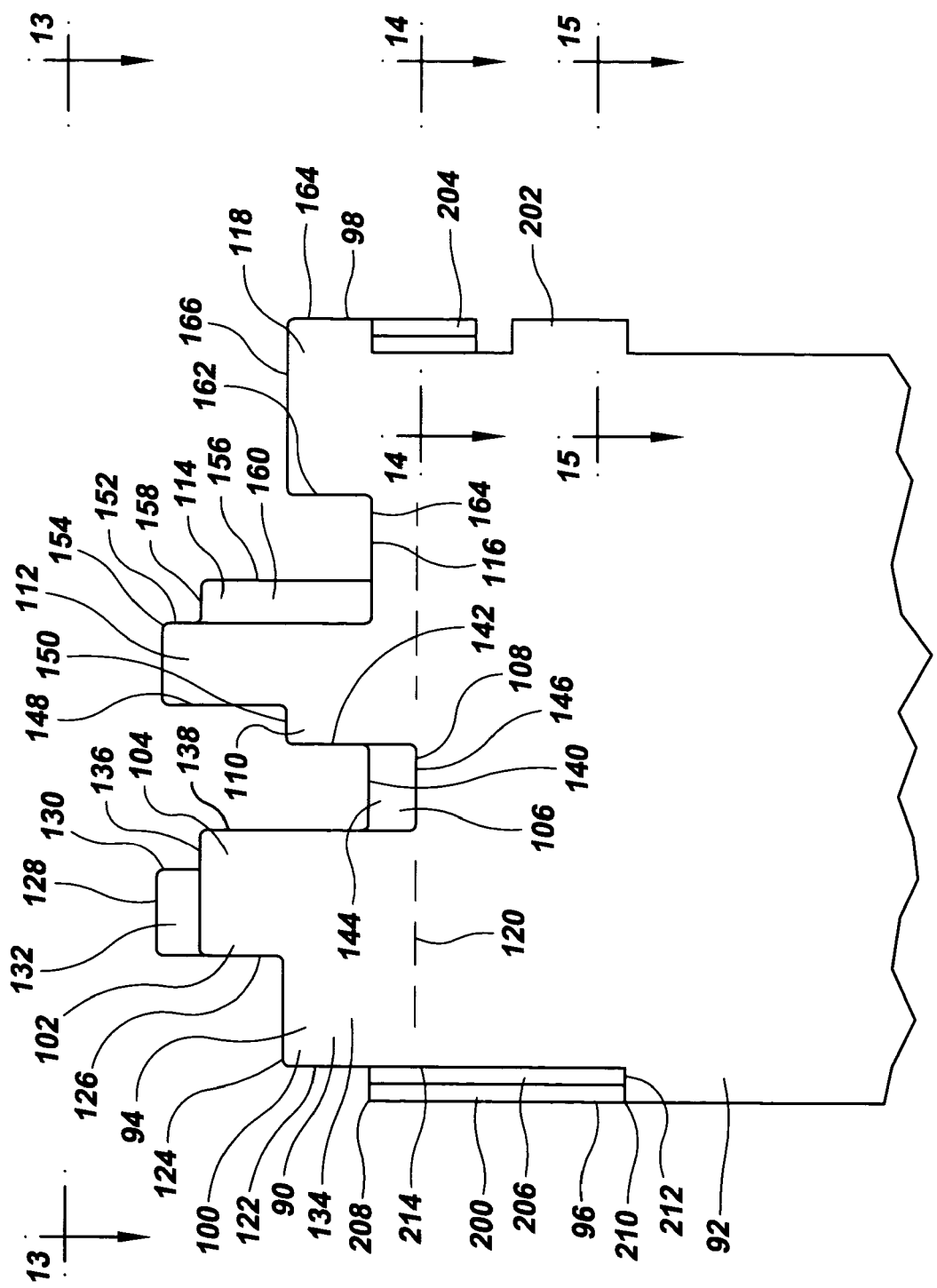
FIG. 9 is a fragmentary perspective view of a typical panel showing the interdigiting projections.
Figure 10:
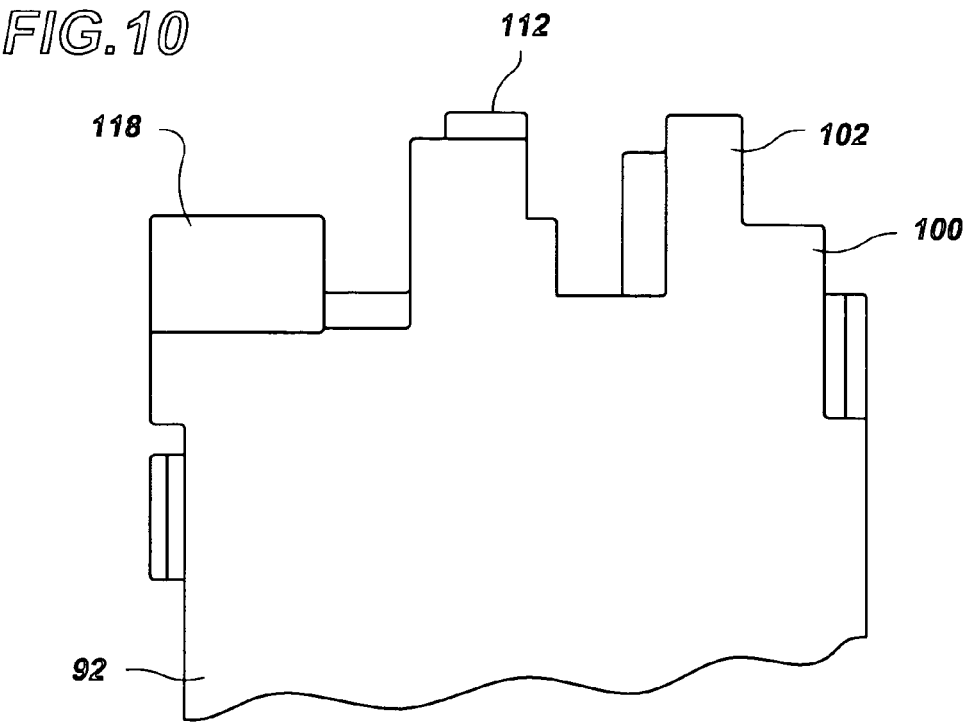
FIG. 10 is a fragmentary elevation view of the panel of FIG. 8 taken along the line 9—9 of FIG. 8.

The construction of the interlocking interface between the various panels is best shown in FIGS. 8–12. FIG. 8 shows a fragmentary perspective view of the top portion 90 of a typical lower panel 92. FIG. 9 shows an elevation view of the top portion of the panel 92 as viewed along the lines 9—9 of FIG. 8 and shows a profile view of the upper portion 94 of the panel 92, the left edge 96 of the panel 92, and the right edge 98 of the panel 92.

The interlocking features of the left and right edges 96, 98 of the panel enable the panel 92 to interlock with and become attached to adjacent similar panels in a manner which will be described presently.

The upper portion 94 of the panel 92 includes a plurality of projecting portions and step portions which cooperate with complementary portions formed on the lower edge of adjacent upper panels in a manner which will be presently described.

As viewed in FIG. 9, the upper portion 94 of the panel 92 includes a first step 100, a second step 102, a third step 104, a fourth step 106, a fifth step 108, a sixth step 110, a seventh step 112, and eighth step 114, a ninth step 116, and a tenth step 118. The various steps will be described with reference to an imaginary reference line which is shown as the broken line 120 in FIG. 9.

The first step 100 is defined by the vertical surface 122, the horizontal surface 124, and the vertical surface 126. The second step 102 is defined by the vertical surface 126, the horizontal surface 128, and the vertical surface 130. The second step 102 is further described by the surface 132 which is below the plane of the surface 134 of the panel 92.

The third step 104 is defined by the vertical surface 130. The horizontal surface 136 and the vertical surface 138.

The vertical surface 138 is disposed to the right of the vertical surface 130.

The fourth step 106 is defined by the vertical surface 138, the horizontal surface 140 and the vertical surface 142. The fourth step 106 is further defined by the surface 144. The surface 144 is disposed below the surface 134 of the panel 92.

The fifth step 108 is defined by the vertical surface 144, the vertical surface 138, the vertical surface 142, and the horizontal surface 146.

The sixth step 110 is defined by the vertical surface 142, the vertical surface 148 and the horizontal surface 150.

The seventh step 112 is defined by the vertical surface 148, the vertical surface 152, and the horizontal surface 154.

The eighth step 114 is defined by the vertical surface 152, the vertical surface 156, and the horizontal surface 158. The eighth step 114 is further defined by the surface 160. The surface 160 is disposed below the surface 134 of the panel 92.

The ninth step 116 is defined by the vertical surface 152, the vertical surface 162 and the horizontal surface 164.

The tenth step 118 is defined by the vertical surface 162, the vertical surface 164, and the horizontal surface 166.

As is best shown in FIG. 8, the surfaces 132, 144, 160 lie in a common plane.

As is best shown in FIGS. 8–12, the panel 92 which has been previously described, forms part of the first row, first course or lower course 54 of the structure 10. The second row or second course or upper course 56 of the panels has a plurality of step portions and surfaces which complement the step portions and surfaces on the panel which have been previously described.

Figure 11:
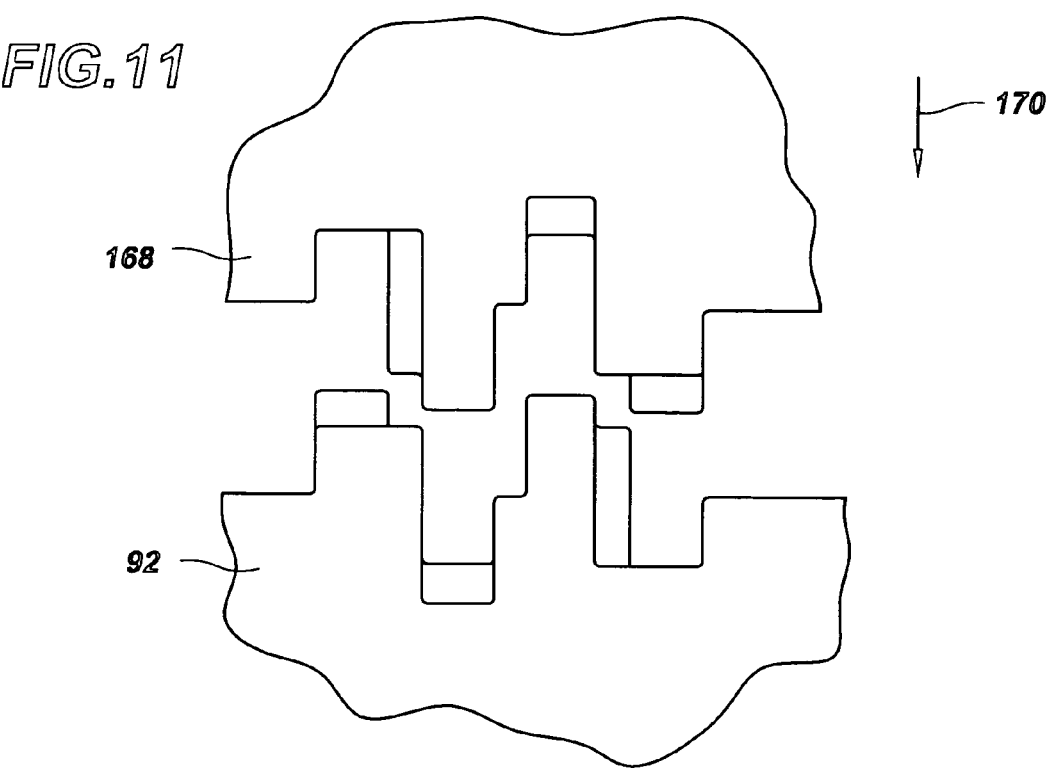
FIG. 11 is a fragmentary elevation view taken along the line 10—10 of FIG. 8.
Figure 12:
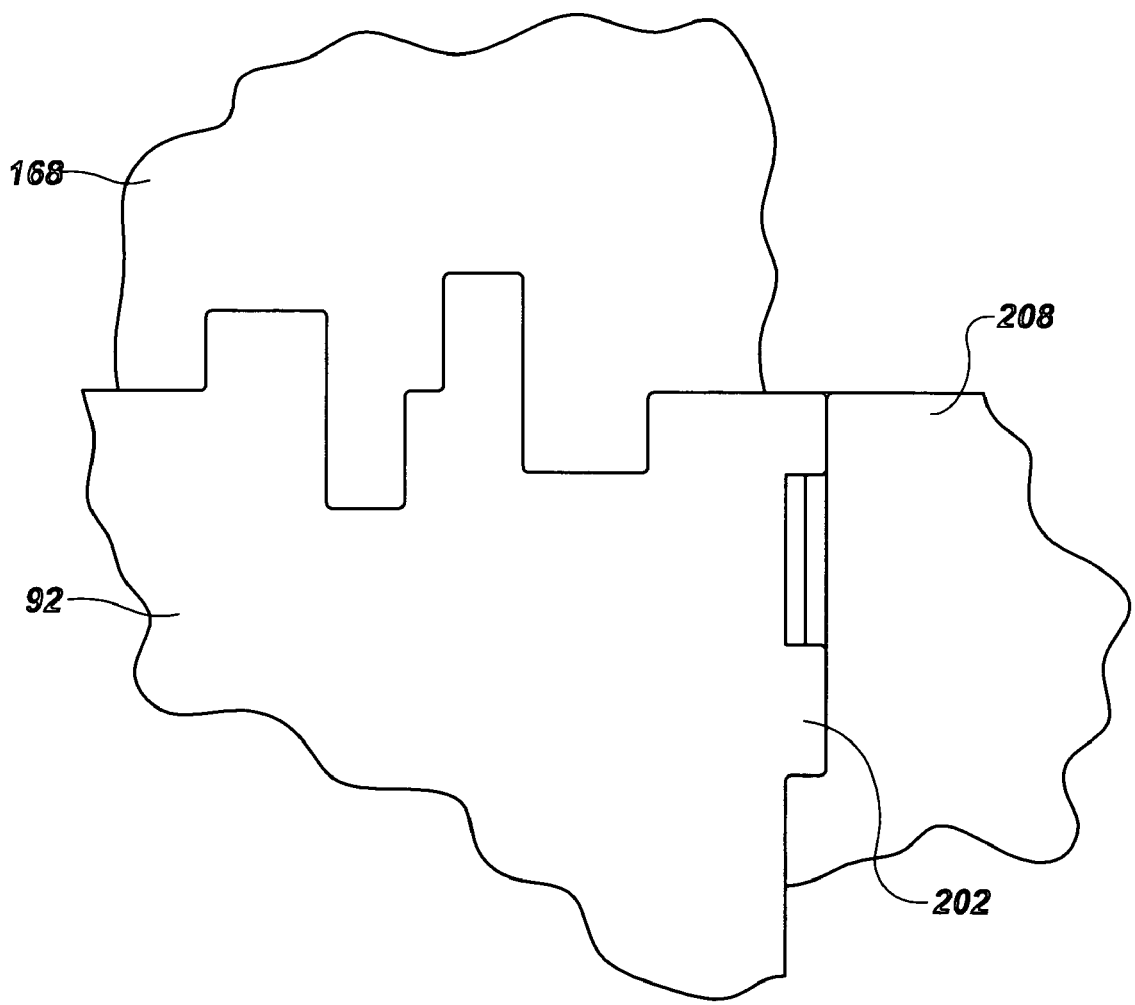
FIG. 12 is a fragmentary elevation view showing the first step in the assembly of an upper panel and a lower panel.
Figure 13:
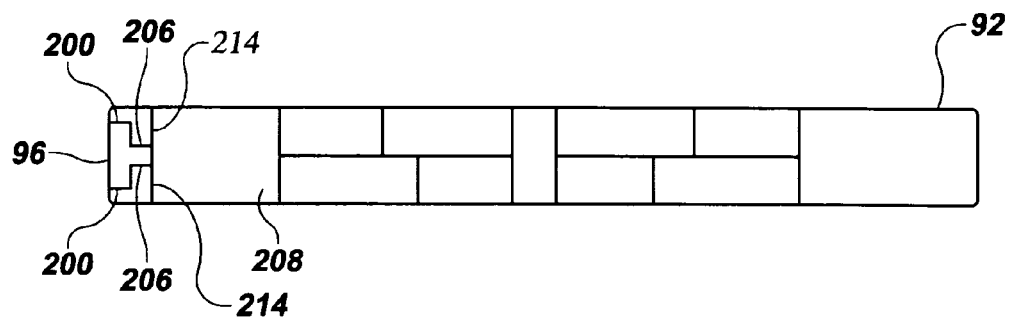
FIG. 13 is a fragmentary elevation view similar to FIG. 11 showing the upper and lower panels of FIG. 11 in an assembled state and showing a second lower panel.
Figure 14:
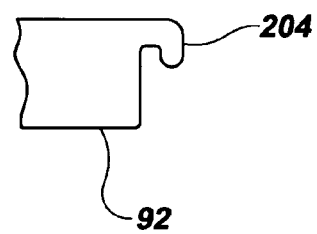
FIG. 14 is a top view taken along the line 13—13 of FIG. 9.
Figure 15:
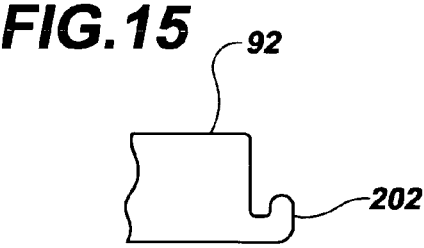
FIG. 15 is a fragmentary cross-sectional view taken along the line 14—14 of FIG. 9.

FIG. 11 shows the first step in the assembly of the typical upper 168 and lower panels 92. As is shown in FIGS. 11 and 12, the projecting portions of the upper 168 and lower panels 92 are brought into mutual engagement by moving the upper panel 168 in the direction shown by arrow 170. FIG. 12 shows the upper and lower panels 168, 92 in fully interlocked or interdigiting engagement. The various projecting portions, surfaces, and step portions formed on the upper and lower panels enable the interlocked upper and lower panels 168, 92 to resist forces which may be applied in the directions shown by the arrows 170, 172, 174, 176, 178 in FIG. 1. The panels can also withstand any combination of the forces shown.

The key interlocking feature as described above enables the various panels to be assembled without the need for tools, fasteners, or clamps or auxiliary equipment of any kind.

The upper portions 180 of the upper panels and the lower portions of the lower panels 182 are generally flat and without any projections. This configuration facilitates mounting the upper channels 64, 66, 68, 70 which are generally formed as "U" shaped channels on the upper panels and facilitate insertion of the lower portions 182 of the lower panels in the base channels which are also generally "U" shaped channels.

In addition to the various projecting portions which facilitate the interlocking engagement of the upper and lower panels as described above, the longitudinal edges typically designated by the reference numerals 96, 98 in FIG. 8 and include a plurality of projecting lips 200, 202, 204 which facilitate the interlocking engagement of adjacent panels.

The interlocking features of the longitudinal edges 96, 98 will be described with reference to FIGS. 8 and 9 which shows a typical panel 92. As is shown in FIG. 9, the left edge portion 96 includes grooves 206 which extend in a downward direction from the surface 208. The lower portion of the grooves 206 end at an intermediate portion 212 of the panel 92. The grooves 206 are further defined by the surfaces 214 and the lips 200.

The right hand portion 98 of the panel 92 includes the upper lip 204 and the lower lip 202.

The lips 200, 202, 204 are similar in construction and facilitate the interlocking engagement of adjacent panel 92, 208.

As is best shown in FIGS. 5, 6 and 7, the structure 10 includes a sliding door 88 which includes panels 76, 78, 80, 82, 84, 86. The panels 76, 78, 80, 82, 84, 86 interlock in the manner previously described to form a single rigid panel 88.

As is best shown in FIG. 6, an upper door channel 220 is mounted on the upper portion 222 of the door 88. The upper door channel 220 includes a pair of leg portions 224, 226 having inwardly directed end portions 228, 230 which engage grooves 232, 234 formed in the surfaces 236, 238 of the door panel 88. The upper door channel 220 also includes a downwardly directed slider leg 240.

The slider leg 240 slides between a pair of upwardly projecting guide legs 242, 244 which are part of the upper wall channel 66. The upper wall channel 66 includes a pair of leg portions 246, 248 and inwardly directed end portion 250, 252 which grasp grooves 254, 256 formed in the surfaces 258, 260 of the wall panels 262 in the manner previously described.

The leg portion 246 includes a projecting leg 254 which projects from an intermediate portion 256 on the leg portion 246. The projecting leg 254 projects in a generally horizontal direction when viewed as in FIG. 6. The projecting leg 254 includes an upwardly projecting flange 258. The end portions of the slider leg 240 and the guide leg 242 have rounded projecting portions 260, 262 which mutually interlock as shown in FIG. 6. The end portion of the flange 258 has a rounded projecting portion 264.

As is best shown in FIG. 6, a roof support channel 266 includes a vertical leg 268 and a horizontal leg 270. The upper end of the vertical leg 268 includes a horizontal portion 272, a downwardly projecting leg 274 and a rounded projecting portion 276. The horizontal portion 272 and the downwardly projecting leg 274 engage and are supported by the upwardly projecting flange 258. The first edge 278 of the horizontal leg 270 engages a groove 280 formed in the surface 282 of the panel 284. The second edge 286 of the horizontal leg 270 has an upwardly projecting flange 288. The horizontal leg 270 and the upwardly projecting flange 288 support the roof beam 290. The roof beam 290 in turn supports the roof 292 which may be formed by solid panels 62 as shown in FIG. 1 or by lengths of any suitable roofing material such as wood or bamboo.

A lower door channel 300 is mounted on the lower portion 302 of the door 88. The lower door channel 300 has a pair of upwardly projecting leg portions 304, 306 and inwardly directed end portions 308, 310 engage the grooves 312, 314 and which grasp the surfaces 316, 318 of the door panel 88 in the manner previously described. The lower door channel 300 has a downwardly directed slider leg 318.

The slider leg 318 slides between an upwardly projecting side leg 320 and the leg portion 322 which are part of the lower wall channel 324. The lower wall channel 324 also has a leg portion 326 and inwardly directed end portions 328, 330 which engage grooves 332, 334 and grasp the surfaces 336, 338 of the wall panel 66 in the manner previously described. The lower door channel 300 is generally similar to the channel 220.

Figure 16:
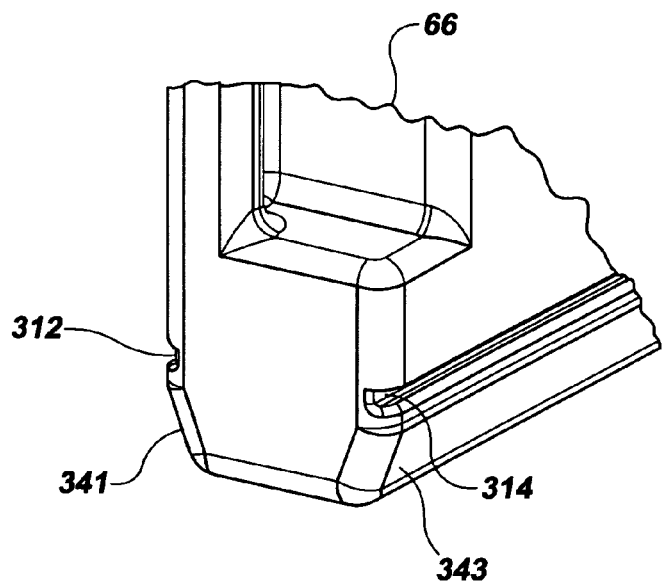
FIG. 16 is a fragmentary perspective view of the lower portion of a typical panel.
Figure 17:
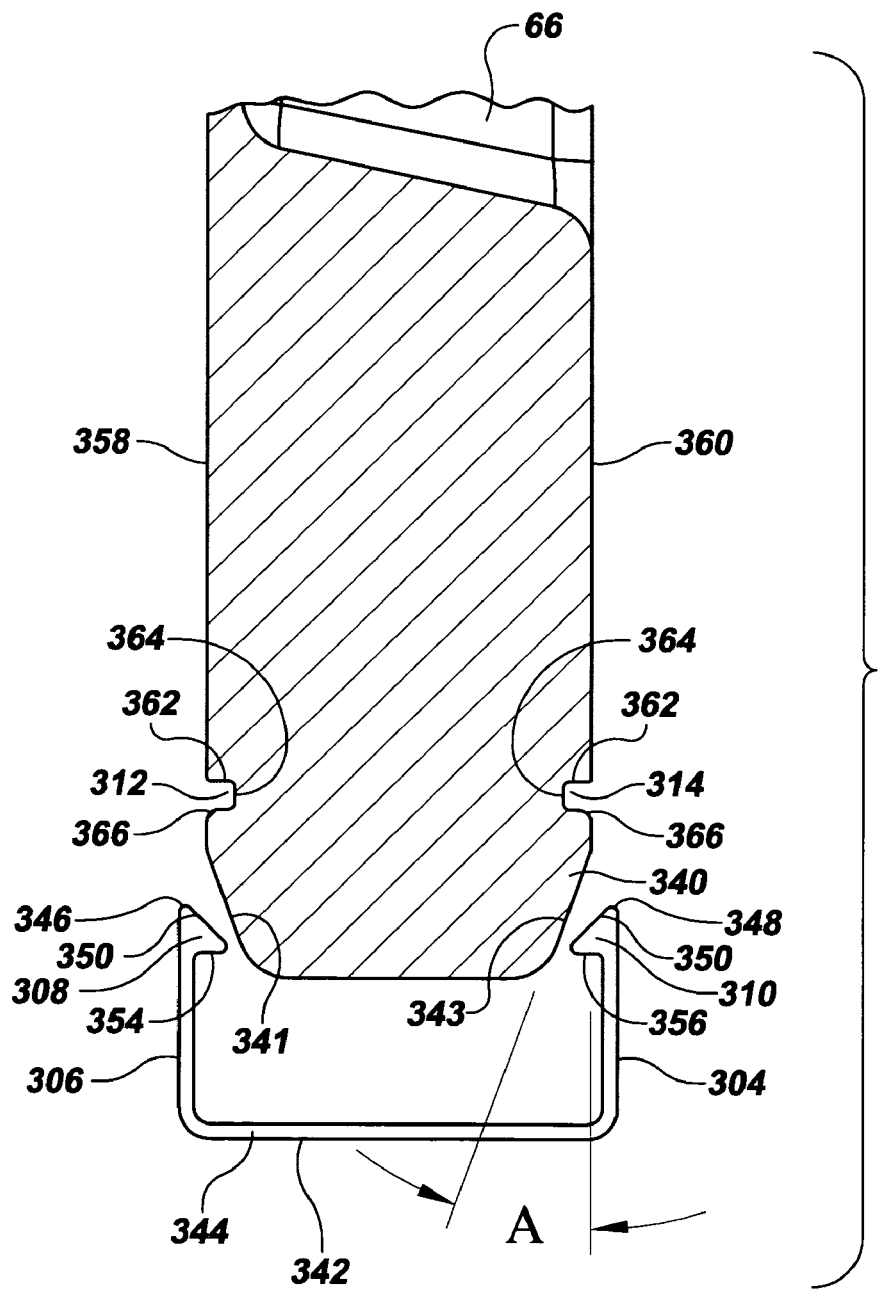
FIG. 17 is a fragmentary exploded cross-sectional view of the lower portion of a typical panel and a base channel.
Figure 18:
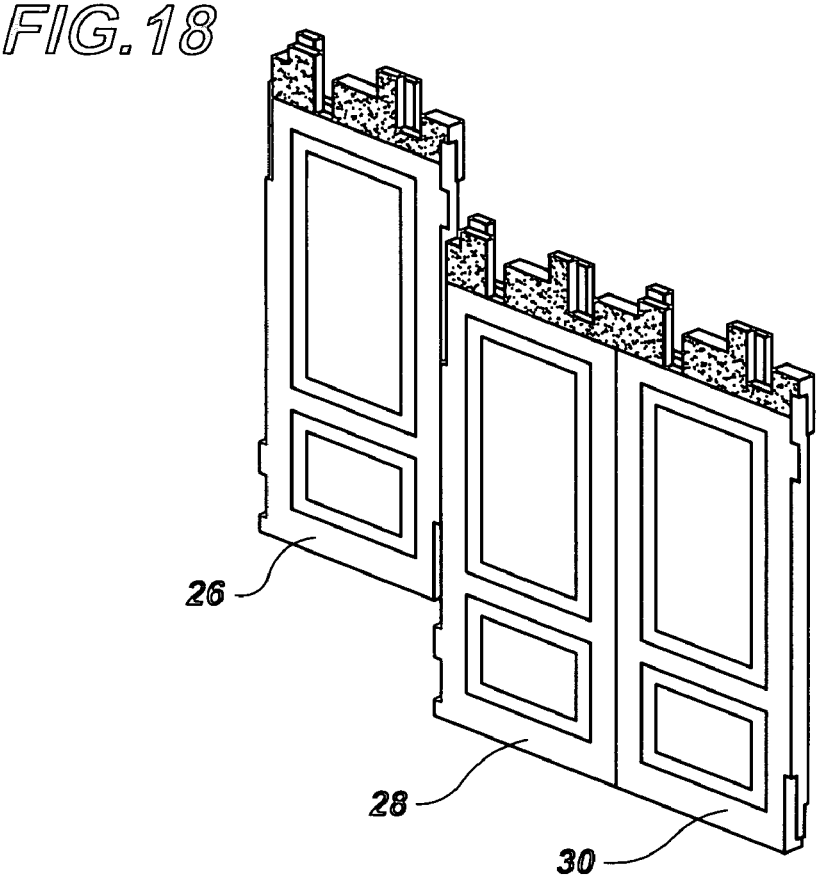
FIG. 18 is a perspective view showing the assembly of typical panels.
Figure 19:
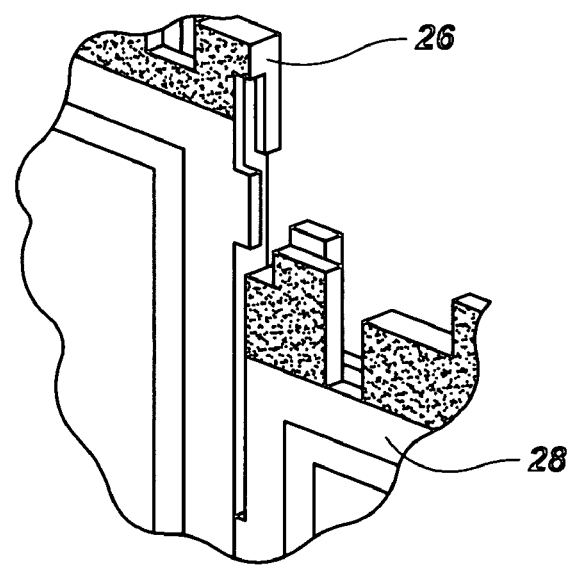
FIG. 19 is a perspective view drawn to an enlarged scale showing the interlocking of typical panels.
Figure 20:
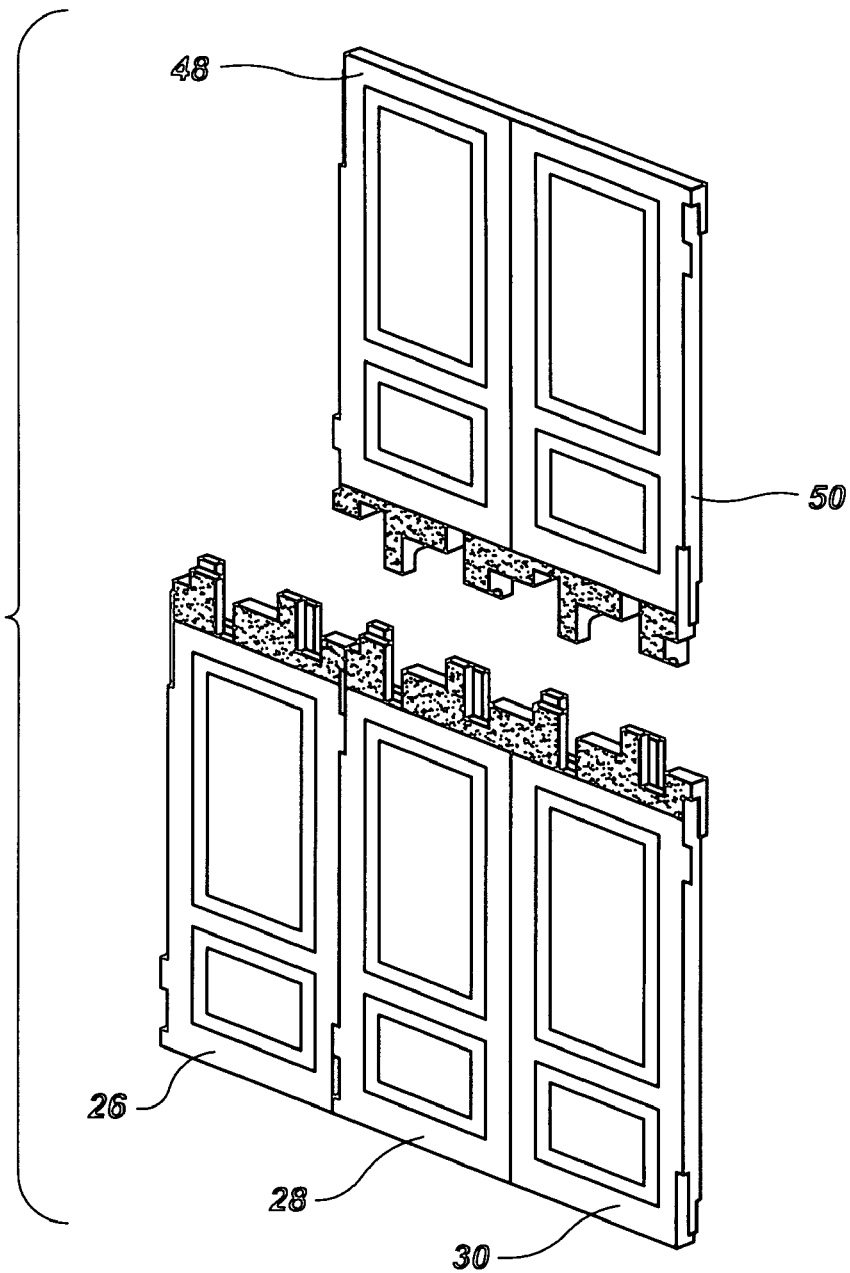
FIG. 20 is an exploded view showing the assembly of lower panels and upper panels.
Figure 21:
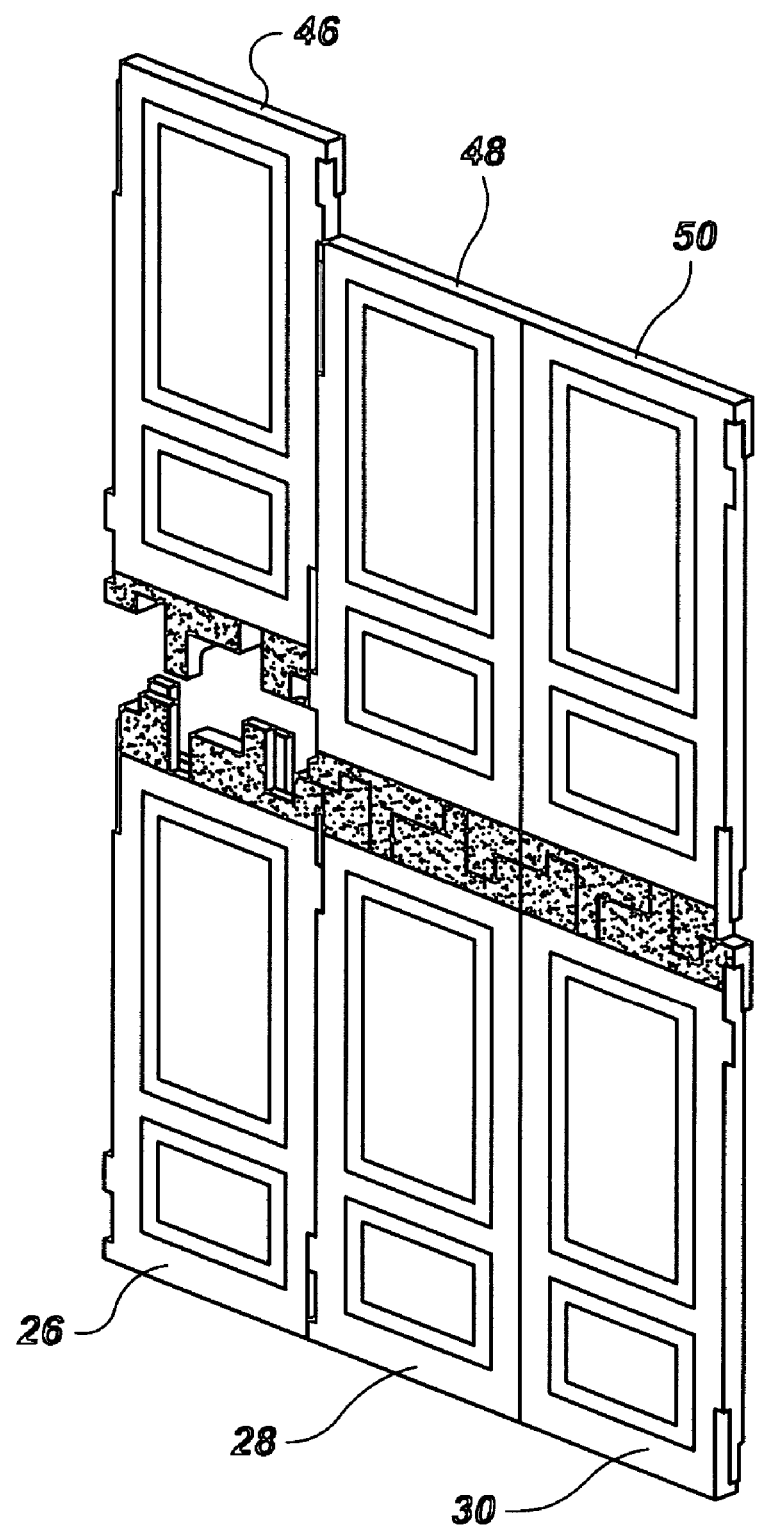
FIG. 21 is an exploded perspective view similar to FIG. 20 showing the assembly of an additional panel.
Figure 22:
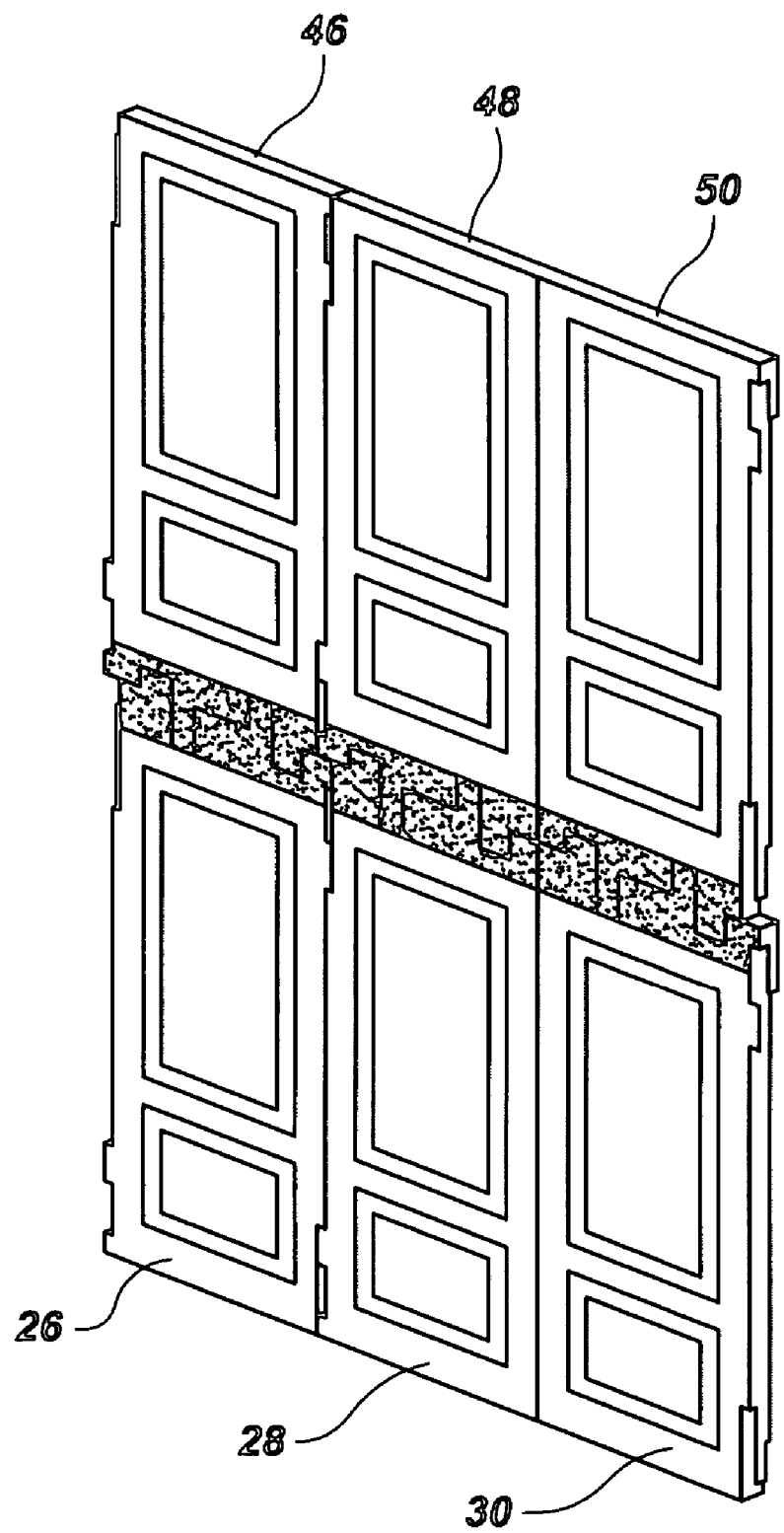
FIG. 22 is a perspective view showing the completion of the assembly of the panels of FIG. 21.

FIGS. 16 and 17 show the details of construction of the lower portion 340 of a typical panel 66. The lower portion 340 engages a lower-rail channel 342. The construction shown in FIGS. 16 and 17 is typical of the upper and lower portions of the various panels such as panels 28, 48.

As is best shown in FIGS. 16 and 17, the portion 340 of the panel 66 is tapered. The angle of taper is denoted by the letter "A." The tapered portion is defined by wall portions 341, 343. A preferred value for the angle of taper is in the order of 20 degrees. The channel 342 has a base portion 344 and a pair of leg portions 304, 306. The upper portion of each of the leg portions 304, 306 has been inwardly directed projecting portion 308, 310. The projecting portions 308, 310 include a rounded end portion 346, 348, a ramp portion 350, 352, and a wall portion 354, 356 which is generally perpendicular to the leg portions 308, 310.

As shown in FIG. 17, the surfaces 358, 360 of the panel 66 includes a groove 312, 314 which is formed by a first wall portion 362 which is generally perpendicular to the surfaces 358, 360 of the panel 66, a second wall 364 portion which is generally parallel to the surfaces 358, 360 of the panel 66, and a third curved wall portion 366. The curved wall portion 366 allows the projecting portions 308, 310 to snap into the grooves 312, 314.

FIGS. 18–22 show the assembly of typical panels 26, 28, 30, 46, 48, 50 which were previously described in connection with FIGS. 1–3. As shown in FIGS. 18–22, the panels 28 and 30 and the panels 48 and 50 are formed as single units.

Figure 23:
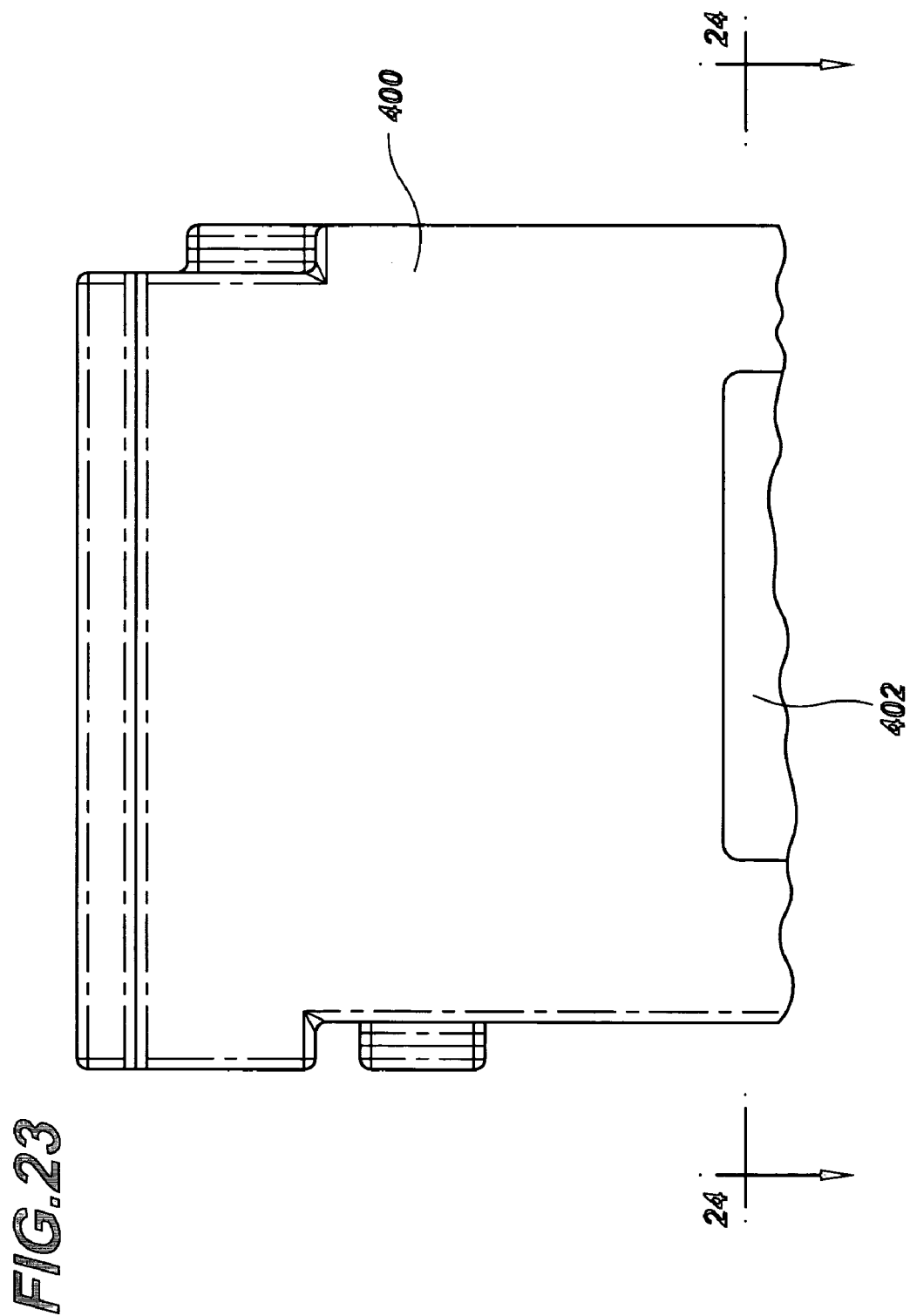
FIG. 23 is an elevation view of a typical window panel.

FIGS. 23–25 show a typical window panel 400. The window panel includes transparent or translucent panes 402, 404, which may be made of glass or plastic, and which is supported by a frame 406 as is shown in FIGS. 24 and 25. FIG. 25 shows a portion of FIG. 24 which is encircled by the arrow which is designated by the letter "B." The frame 406 includes flanges 408, 410, 412 which support the panes 402, 404. The frame 406 also includes flanges 414, 416 which fit within an aperture 420 which is formed in the panel 400. The frame 400 is held in place by a screw 420 which forces the frame 400 to bear against the step portion 422 of the panel 400.

Each of the panels is preferably formed as a hollow, plastic integrally molded member. The panels may preferably each have a plurality of indentations indicated typically by the reference numerals 506, 508, 510, 512 in FIG. 2 which form individual panels 514. The indentations add stiffness to the panels and provide a degree of aesthetic appeal.

The foregoing specific embodiment of the present invention as set forth in the specification herein is for illustrative purposes only. Various deviations and modifications may be made within the spirit and scope of this invention without departing from the main theme thereof.

What is claimed is:

1. A prefabricated housing structure comprising:
a first plurality of wall panels;
a second plurality of wall panels;
a first plurality of channel members;
a second plurality of channel members;
first connection means disposed connecting a selected one of said first plurality of wall panels to a selected one of said second plurality of wall panels;
second connection means disposed connecting a selected one of said first plurality of wall panels to another selected one of said first plurality of wall panels;
third connection means disposed connecting a selected one of said second plurality of wall panels to another selected one of said second plurality of wall panels; and
wherein said selected one of said first plurality of wall panels has an edge defining a perimeter of one side of the panel, said edge along a full length thereof being flat without comprising any of the first, second or third connection means and wherein each of said pluralities of wall panels comprises a shorter straight edge.

2. The prefabricated housing structure as claimed in claim 1 wherein said first plurality of wall panels combines a rectangular member having a first and a second shorter edge and a first and a second longer edge.

3. The prefabricated housing structure as claimed in claim 2 wherein said first of said shorter edges on said first plurality of wall panels includes first connection means for connecting to said shorter edges of said second plurality of wall panels and in which said first of said shorter edges on said second plurality of wall panels includes said second connection means for connecting to said shorter edges of said first plurality of wall panels.

4. The prefabricated housing structure as claimed in claim 1 wherein said first connection means comprising first projecting portions disposed projecting from each of said first plurality of wall panels, and said third connection means comprises second projecting portions disposed projecting from each of said second plurality of wall panels.

5. The prefabricated housing structure as claimed in claim 1 wherein said each of said connection means comprises interconnecting means.

6. The prefabricated housing structure as claimed in claim 1 wherein said each of said connection means comprises interdigiting means.

7. The prefabricated housing structure as claimed in claim 1 wherein said each of said connection means comprises interlocking means.

8. The prefabricated housing structure as claimed in claim 1 wherein each of said pluralities of wall panels comprises a planar member.

9. The prefabricated housing structure as claimed in claim 1 wherein each of said pluralities of wall panels is planar and wherein each of said connection means is capable of withstanding forces in a direction parallel to said pluralities of wall panels.

10. The prefabricated housing structure as claimed in claim 9 wherein each of said connection means is capable of withstanding forces in a direction perpendicular to said pluralities of wall panels.

11. The prefabricated housing structure as claimed in claim 1 wherein each of said pluralities of wall panels comprises a hollow wall panel.

12. The prefabricated housing structure as claimed in claim 1 wherein each of said pluralities of wall panels comprises a plastic panel.

13. The prefabricated housing structure as claimed in claim 1 wherein said first plurality of wall panels each combines a rectangular member having a first and a second shorter edge and a first and a second longer edge, and said shorter edges of said first plurality of wall panels are disposed received in said first plurality of channel members.

14. The prefabricated housing structure as claimed in claim 1 wherein said shorter edges of said second plurality of wall panels are disposed received in said second plurality of channel members.

15. The prefabricated housing structure as claimed in claim 1 further comprising a plurality of roof panels.

16. A prefabricated housing structure comprising:
a first plurality of wall panels;
a second plurality of wall panels;
a door panel and channel means disposed accepting said door panel in a sliding relationship relative to said wall panels;
first connection means disposed connection a selected one of said first plurality of wall panels to a selected one of said second plurality of wall panels;
second connection means disposed connecting a selected one of said first plurality of wall panels to another selected one of said first plurality of wall panels;
third connection means disposed connecting a selected one of said second plurality of wall panels to another selected one of said second plurality of wall panels; and
wherein said selected one of said first plurality of wall panels has an edge defining a perimeter of one side of the panel, said edge along a full length thereof being flat without comprising any of the first, second or third connection means.

17. The prefabricated housing structure as claimed in claim 16 wherein the channel means are U shaped.

* * * * *